United States Patent [19]

Liu

[11] Patent Number: 5,400,035
[45] Date of Patent: Mar. 21, 1995

[54] FALSE TRACK DISCRIMINATION IN THE SIDELOBE REGION OF A MONOPULSE ANTENNA

[75] Inventor: Sien-Chang C. Liu, Brea, Calif.

[73] Assignee: Hughes Aircraft Company, Los Angeles, Calif.

[21] Appl. No.: 173,301

[22] Filed: Dec. 23, 1993

[51] Int. Cl.⁶ ............................................. G01S 13/44
[52] U.S. Cl. ..................................... 342/149; 342/90
[58] Field of Search ......................... 342/149, 90, 379

[56] References Cited

U.S. PATENT DOCUMENTS 5,030,960  7/1991  Bartley ........................... 342/149 X
5,072,224  12/1991  Verbeke et al. ................. 342/149 X Primary Examiner—Mark Hellner
Attorney, Agent, or Firm—W. K. Denson-Low

[57] ABSTRACT

A radar target discrimination method (50) prevents sidelobe monopulse tracking. The beamwidth difference between the main beam monopulse and sidelobe monopulse is utilized to distinguish the main beam monopulse tracks from sidelobe monopulse tracks. After the first monopulse beam (52, 54), the monopulse beam is moved (58) to two additional beam pointing angles such that the target will stay on the same side of the true main beam monopulse slope but will fall on the opposite side of the sidelobe monopulse slope. The sign and magnitude of the difference/sum ($\Delta/E$) measurements (60, 62, 64) can be used to distinguish a valid main beam track from a false sidelobe track. False tracks are detected if the signs of the difference/sum measurements are not identical, or if the magnitudes of the measurements do not monotonically increase or decrease.

21 Claims, 6 Drawing Sheets

FALSE TRACK DISCRIMINATION IN THE SIDELOBE REGION OF A MONOPULSE ANTENNA

FIELD OF THE INVENTION

This invention relates to monopulse tracking radars, and more particularly to a technique for preventing sidelobe monopulse tracking.

BACKGROUND OF THE INVENTION

Counter-battery radars are used to track incoming artillery shells or mortar rounds. The target radar cross section (RCS) of an artillery shell or a mortar round is usually in the range of −22 dBsm (square meter) to −40 dBsm. An aircraft which has an RCS between +14 dBsm and −10 dBsm can fall in the sidelobe region of the radar antenna and produce a signal strength similar to a true artillery shell or mortar round target tracked by the main beam monopulse. In several field tests where aircraft and artillery shells co-exist, aircraft have been falsely tracked by the sidelobe monopulse and mistaken as an artillery shell because the −30 dB to −50 dB sidelobe level suppresses the aircraft RCS to the size of an artillery shell RCS. Since the aircraft is tracked in the sidelobe region the angular error is usually large.

To address this problem, sidelobe blanking systems have been employed which utilize a low-gain omnidirectional antenna operating in conjunction with the sum beam. Signals from both antennas are fed to separate receivers and their outputs compared. Any comparisons showing greater power level in the low gain channel are canceled, thus eliminating returns from those sectors of the sum beam having gain levels less than the omnidirectional antenna. A gain control in the omnidirectional antenna channel is required for adjusting the degree of sidelobe blanking.

The disadvantages of the sidelobe blanking system are: (1) it requires an additional omnidirectional antenna and a receiver channel, (2) gain control between the receiver channels has to be checked periodically to ensure no faulty results due to receiver gain variation over time, and (3) additional antenna and receiver hardware are difficult to fit to the existing form factor and radar platform. This invention eliminates these disadvantages.

SUMMARY OF THE INVENTION

This invention includes a method for discriminating against false sidelobe tracking in a monopulse radar system, wherein monopulse main and sidelobe beams are formed. The invention exploits the characteristic that the main beam monopulse is considerably wider than the sidelobe monopulse. The method comprises the following steps:

forming first monopulse sum and difference beams pointing at a first beam pointing angle;

processing the first monopulse beams to detect a potential target track at an approximate potential target angle;

calculating a first ratio of the first difference beam and the first sum beam at the first beam target angle;

forming second and third monopulse sum and difference beams at respective second and third beam pointing angles offset from the first pointing angle;

processing the second and third monopulse beams to detect second and third beam potential target tracks corresponding to the first beam target track;

calculating a second ratio of the second difference beam and the second sum beam;

calculating a third ratio of the third difference beam and the third sum beam; and accepting or rejecting the potential target track as a true target track in dependence on characteristics of the first, second and third ratios.

The second and third beam pointing angles are selected in dependence on a power value calculated from the first ratio. The second and third beams are selected as offset angles from the first pointing angle and toward the target if the power value equals or exceeds a predetermined threshold.

The step of accepting or rejecting the track comprises accepting the potential target as a true target track only if magnitudes of the first, second and third ratios decrease monotonically from the first ratio to said second ratio, and from the second ratio to the third ratio, and rejecting the potential target if the magnitudes do not decrease monotonically.

The characteristics of the ratios can further include the signs of the ratios, and the step of accepting or rejecting the track comprises accepting the potential target as a true target track only if the signs of the respective ratios are the same, and rejecting the potential target if the signs are not the same.

If the power value calculated from the first ratio is less than a predetermined threshold, then the second and third beams are selected as offset angles from the first pointing angle and away from the estimated target angle.

The step of accepting or rejecting the track comprises accepting the potential target as a true target track only if magnitudes of the first, second and third ratios increase monotonically from the first ratio to the second ratio, and from the second ratio to the third ratio, and rejecting the potential target if the magnitudes do not increase monotonically.

The characteristics of the ratios can further include the signs of the ratios, and the step of accepting or rejecting the track comprises accepting the potential target as a true target track only if the signs of the respective ratios are the same, and rejecting the potential target if the signs are not the same.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
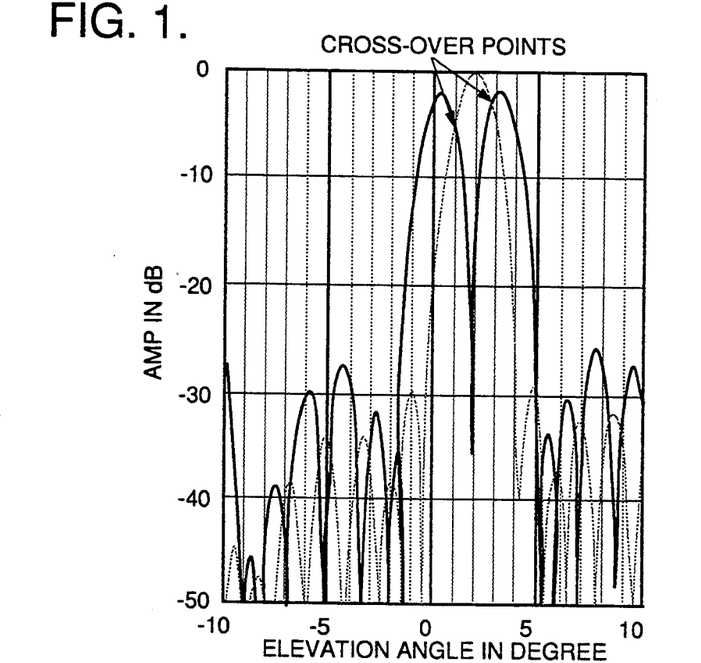
FIG. 1 illustrates an exemplary monopulse pattern, showing antenna elevation difference beam and sum beam patterns.

A monopulse antenna system, including systems using phased array antennas or reflector antennas, develops a sum beam and a difference beam. The target is normally tracked in the main beam area. However, there are other sidelobe sectors outside the main beam that can form a pattern similar to the monopulse characteristics but with lower antenna gain. A typical monopulse pattern is shown in FIG. 1. The main beam is pointing to 1.65° and a monopulse pattern is formed at that angle. Careful examination of this figure reveals that several monopulse patterns are formed in the sidelobe region at +5.8°, +6.9°, +8.7°, and other places. If an aircraft is tracked at these angles, then the amplitude of radar return is suppressed by the −35 dB sidelobe level and becomes indistinguishable from the return of an artillery shell with −25 dBsm RCS. This means the false track cannot be discriminated by the measured target strength.

Figure 2:
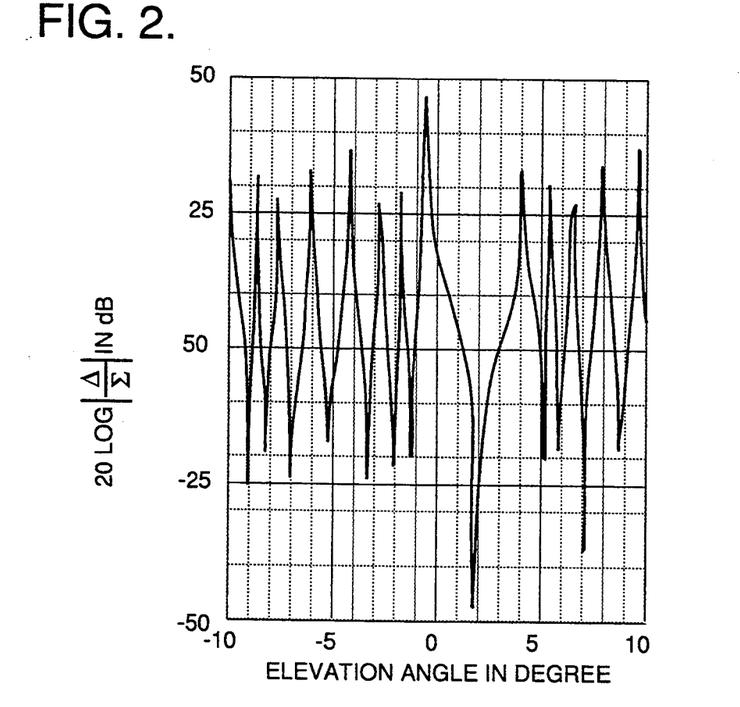
FIG. 2 shows a delta/sum ratio pattern from the monopulse pattern of FIG. 1.

This invention uses a new approach to discriminate the false tracks in the sidelobe region. To explain this invention, a delta-over-sum ($\Delta/E$) pattern of FIG. 1 is plotted in FIG. 2 to show the beam splitting characteristics of the monopulse. The monopulse beam splitting characteristics provide measured target position in azimuth and elevation direction cosine space relative to the antenna. The monopulse beam splitting curve as shown in FIG. 2, is usually approximated by a cubic function and used in radar computers to estimate target position in azimuth and elevation. At 1.65° the width of the main beam monopulse is about 4.6°, while the width of the sidelobe monopulse is less than 1.8°. Using the fact that the main beam monopulse beam width is about two and one-half times wider than that of the sidelobe monopulse, the false tracks in the sidelobe region can be discriminated by pointing the beam to two additional angles and then matching the amplitude of $\Delta/E$ measurements to the slope of the main beam monopulse curve shown in FIG. 2. If the $\Delta/E$ measurements fail to match the slope, then the target is in the sidelobe region and can be eliminated from the track report.

Figure 3:
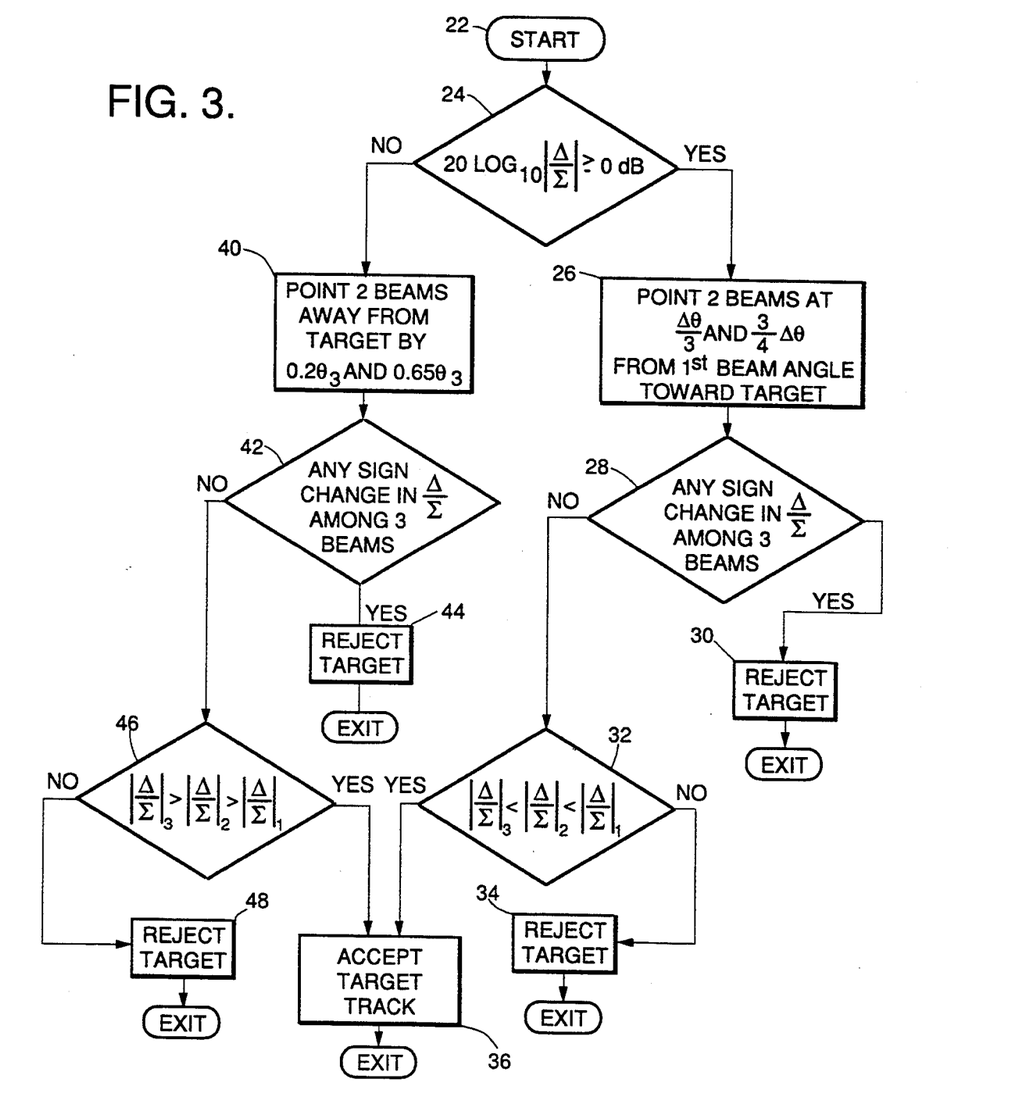
FIG. 3 is a flow chart illustrating a method in accordance with the invention for discriminating false sidelobe tracks.
Figure 4:
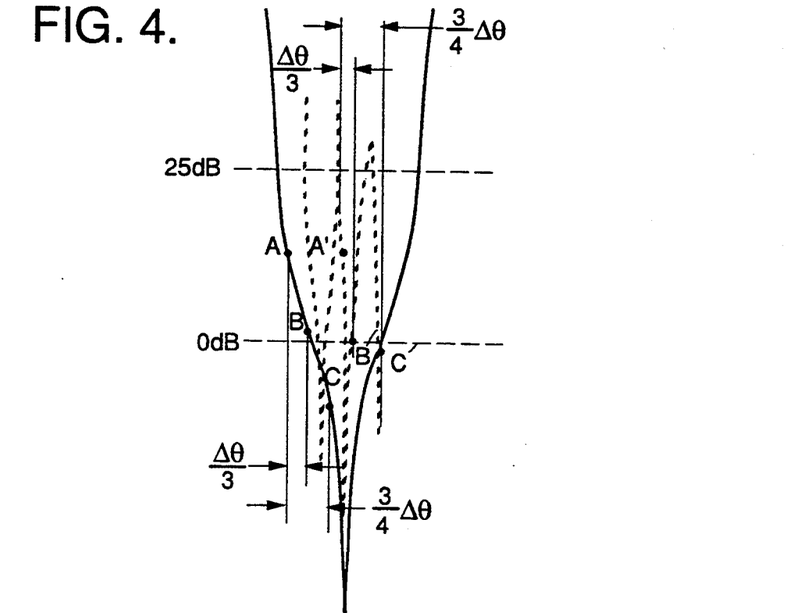
FIGS. 4 and 5 show overlays of the exemplary main beam monopulse splitting pattern (solid line) and the sidelobe monopulse beam splitting pattern (dotted line).

An exemplary algorithm to discriminate false sidelobe tracks in accordance with the invention is illustrated in the flow chart of FIG. 3. The magnitude of the first delta-over-sum ($\Delta/E$) measurement, which is independent of target RCS, determines which branch of the algorithm will be used. If the value of $20 \log |(\Delta/E)|$ is larger than 0 dB, then the target is outside the different and sum patterns cross-over points shown in FIG. 1. The next two beams shall be moved toward the target by $(\frac{1}{3})\Delta\Theta$ and $(\frac{2}{3})\Delta\Theta$, where $\Delta\Theta$ is the estimated target angle of the first beam. The estimated target angle of the first beam is derived from the beam splitting characteristic curve based on the sign and the value of the $(\Delta/E)_1$ output. The initial beam is beam #1, and the two additional beams are beams #2 and #3. If the target is in the sidelobe region, then it is very likely the target will fall on the opposite side of the monopulse slope as shown in FIG. 4. FIG. 4 shows two ($\Delta/E$) beam splitting slopes. The wider monopulse is the main beam while the narrower monopulse is the sidelobe. When the beams are moved toward the target by $(\frac{1}{3})\Delta\Theta$ and $(\frac{2}{3})\Delta\Theta$, the target position moves from A to B to C on the main beam monopulse. However, the same beam movement will move the target from A' to B' and C' on the sidelobe monopulse. The change from one side of the monopulse slope to the opposite side slope results in the sign changes of $\Delta E$ and can be easily detected. Thus, the false tracks in the sidelobe region can be rejected. An additional ($\Delta/E$) magnitude test is also included to check the relative amplitude of the target returns from three beams. If $|(\Delta/E)_3| < |(\Delta/E)_2| < |(\Delta/E)_1|$ condition is satisfied, then the track is in the main beam, otherwise the track is false and should be rejected.

Figure 5:
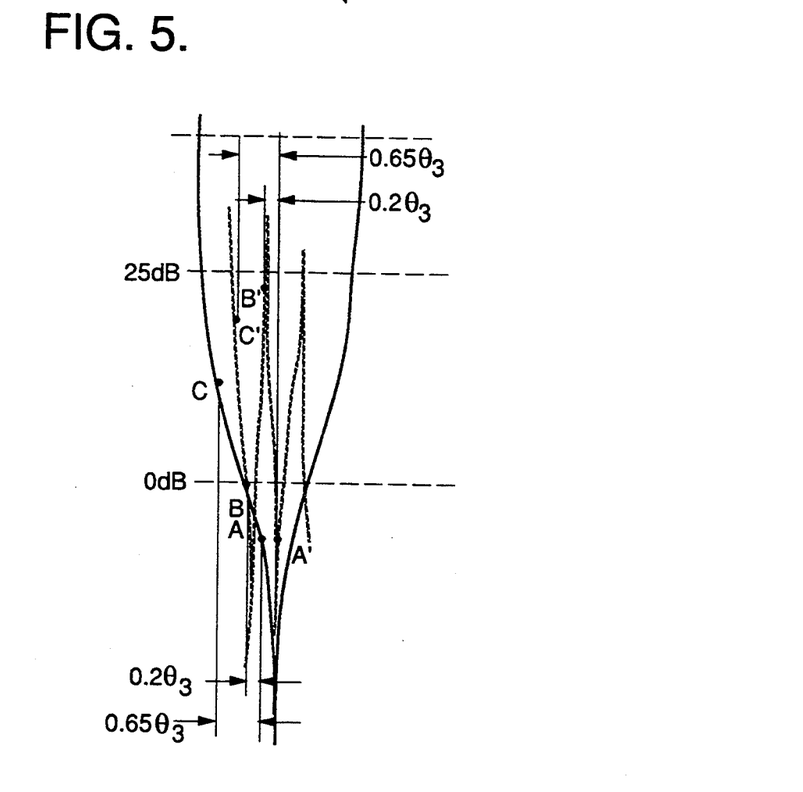

If the target is inside the cross-over points (i.e., $20 \log_{10}|\Delta/E| < 0$dB), then two additional beams shall be pointed away from the target position by $0.2 \Theta_3$ and $0.65 \Theta_3$, where $\Theta_3$ is the 3 dB beamwidth of the sum beam. Again, if the target is in the sidelobe region, then it is likely that the target will fall on the opposite slope of a neighboring monopulse as shown in FIG. 5. FIG. 5 shows the target locations of the main beam and sidelobe monopulse slopes. When the beams are moved away from the target by $0.2 \Theta_3$ and $0.65 \Theta_3$, the target position moves from A to B to C on the main beam monopulse. The same beam movement will move the target from A' to B' to C' on the sidelobe monopulse.

Point B' is on the opposite slope of the next monopulse and hence $(\Delta/E)_2$ has a sign change. This enables discrimination of the false tracks in the sidelobe region. An additional ($\Delta/E$) magnitude test is also added to check the relative amplitude of the initial beam and two additional beams. If $|(\Delta/E)_3| > |(\Delta/E)_2| > |(\Delta/E)_1|$, then the target returns follow the slope of the main beam monopulse. Otherwise the track is declared false.

FIG. 3 illustrates a logic flow diagram of the algorithm 20. At the start 22 of the algorithm, a monopulse beam is formed which is directed at a first pointing angle. At step 24, the power in dB of the difference/sum beam ratio is determined and compared to 0 dB. If this power is greater than or equal to 0 dB, operation branches to step 26. If the measured power is less than 0 dB, operation branches to step 40. If operation has branched to step 26, two new monopulse beams are formed, at $(\frac{1}{3})\Delta\Theta$ and $(\frac{2}{3})\Delta\Theta$ from the first beam angle toward the target, where $\Delta\Theta$ is the estimated target angle. The difference/sum beam ratio is measured at each new pointing angle. At step 28, the signs of the delta/sum ratio in each of the three beams are compared to determine if there are any sign changes. If there was a sign change, the target is rejected (step 30), and the algorithm exited. If there was no sign change, then the magnitudes of the difference/sum ratios for the three beams are compared. If the magnitudes of beam 1, beam 2 and beam 3 decrease monotonically, then the track is accepted as a target track (step 36) and the algorithm exited; if the magnitudes do not decrease monotonically, the target is rejected (step 34) and the algorithm exited.

Returning to step 24, if the power level of the difference/sum ratio does not exceed 0 dB, then operation branches to step 40. For this smaller signal, two beams are formed which are pointed away from the target at the first pointing angle by $0.2 \Theta_3$ and $0.65 \Theta_3$, where $\Theta_3$ is the 3 dB beamwidth of the sum beam. At step 42 the signs of the ratios of the difference/sum beams are compared. If there is a sign change among these ratios, then the target is rejected as a false track (step 44), and the algorithm is exited. If there is no sign change, then the magnitudes of the difference/sum ratios are compared to determine if magnitudes increase monotonically from beam 1 to beam 2 to beam 3. If not, the target is rejected at step 48; if so, the track is accepted as a valid target track at step 36, and the algorithm is exited.

Figure 6A:
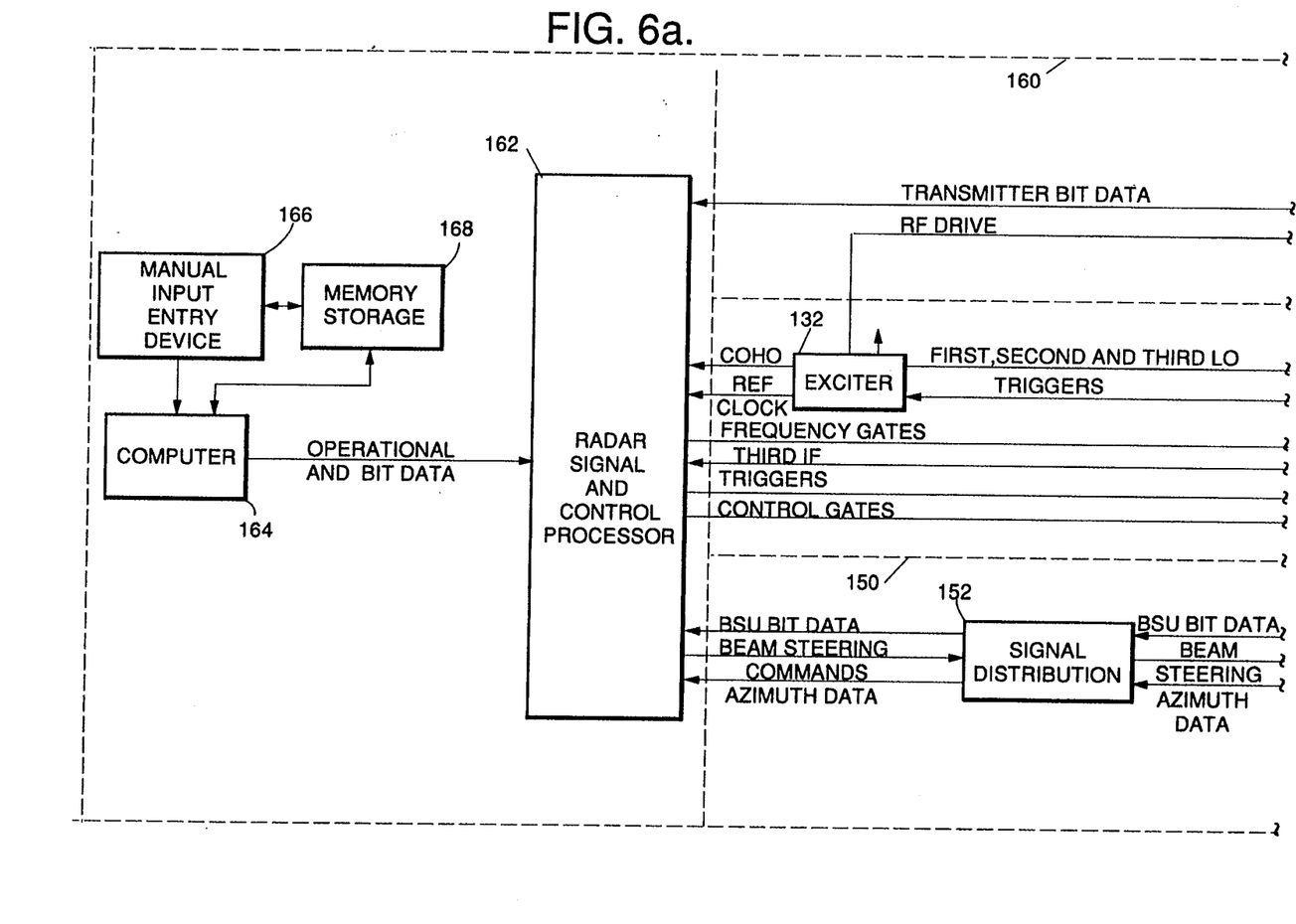
FIG. 6A and 6B are a block diagram of an exemplary monopulse radar system which can be programmed to perform the method of FIG. 3.
Figure 6B:
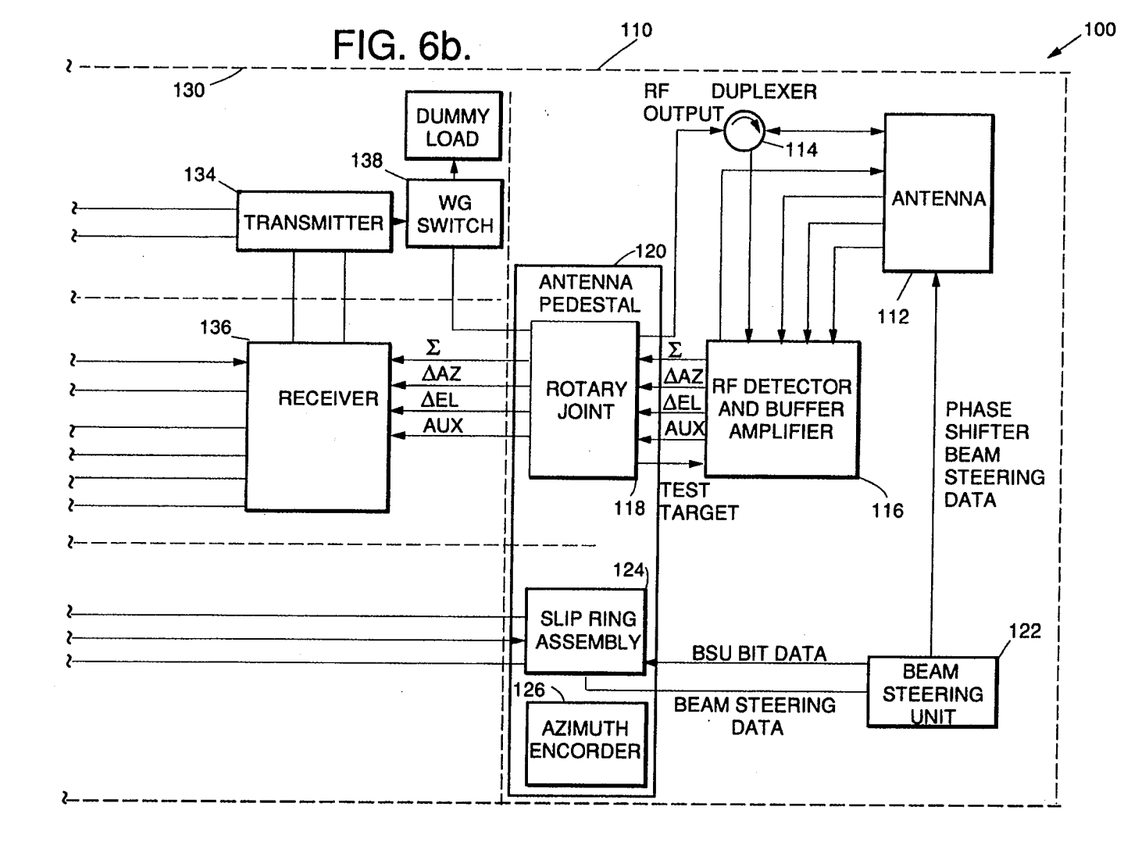

FIG. 6 is a simplified block diagram illustrative of a monopulse radar system 100 which may be programmed to carry out the algorithm of FIG. 3. The system includes an antenna section 110, a transceiver section 130, a signal distribution section 150 and a processing section 160. The antenna section 110 includes the antenna 112, which is coupled to a duplexer 114 to separate the transmitter and received signals. Antenna received signals from the duplexer 114 and directly from the antenna 112 are directed to an RF detector and amplifier 116, and sum, difference azimuth and difference elevation signal are sent via a rotary joint 118 mounted on the antenna pedestal 120 to the receiver 136. A beam steering unit 122 controls the steering of beams formed by the antenna 112, and interfaces through a slip ring assembly 124 with the signal distribution function 152 of section 150. An azimuth encoder 126 provides encoder data to the section 152 which indicates the azimuth position of the antenna pedestal.

The transceiver section 130 includes the radar exciter 132, the transmitter 134 which receives the RF drive signal from the exciter and provides the high power transmit signal through a waveguide switch 138 to the rotary joint and the duplexer to the antenna. The receiver 136 in this embodiment provides a third IF signal to the radar signal and control processor 162, from which the signals used to perform the algorithm can be derived.

The processor section 160 includes the processor 162, a computer 164, manual data entry device 166 and a data storage device 168. Operational commands can be provided to the processor 162, and data from the processor 162 can be provided to the computer. In accordance with this invention, the processor section 160 is programmed to carry out the algorithm of FIG. 3. For typical phased array antennas, the second and third beams are electronically steered. However, this invention can also be applied to multiple feed horn reflector antennas which use physical rotation to point the second and third beams.

It will be appreciated that the system 100 is, in terms of the general hardware elements shown in FIG. 6, of a conventional design. In accordance with the invention, the processor 162 and/or computer 164 can be programmed to perform the algorithm of FIG. 3. Thus conventional monopulse radars can be readily modified to include the invention, simply by modifying the software performed by the processor elements of the system.

Figure 7:
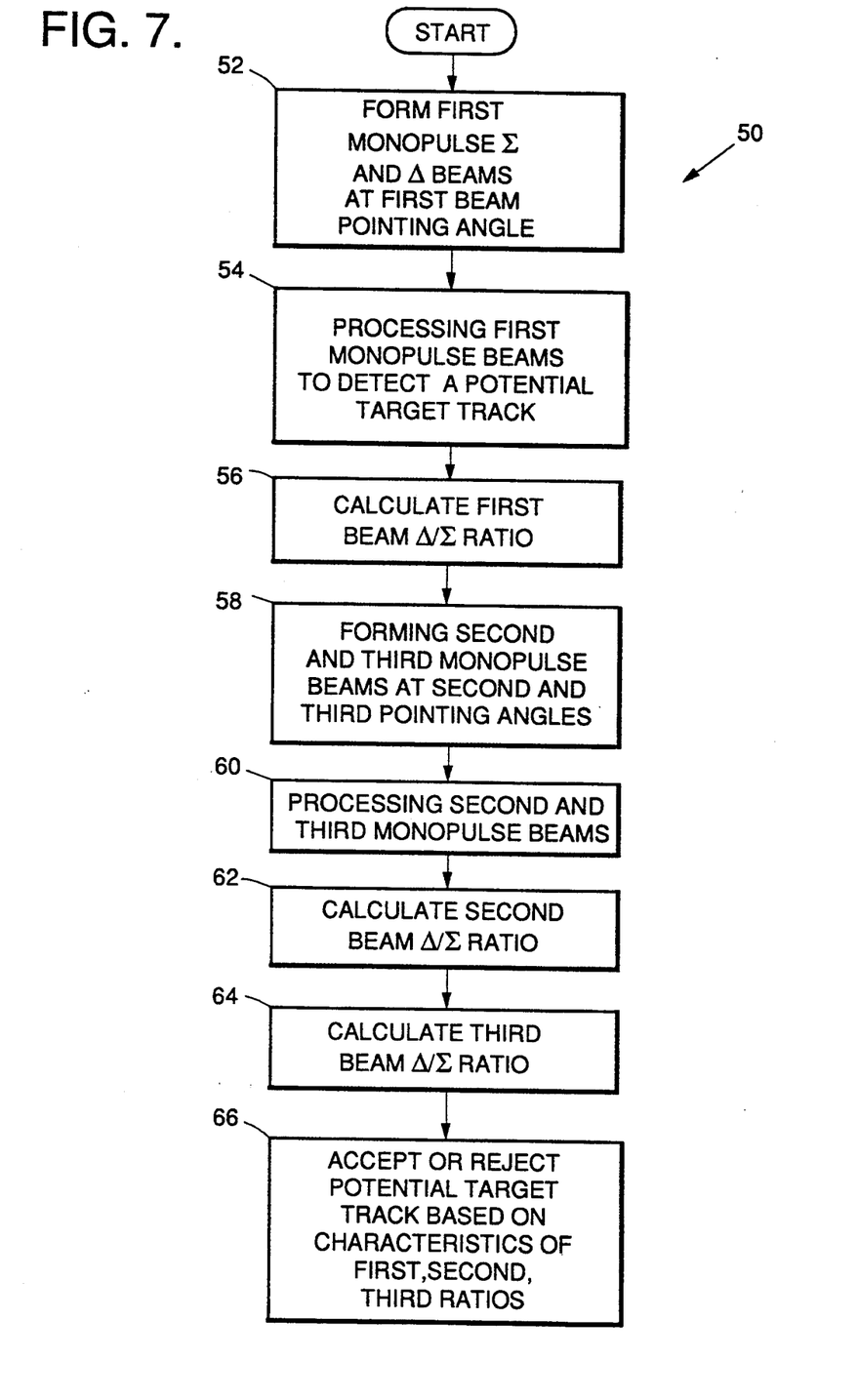
FIG. 7 is a flow diagram illustrating a generalized method in accordance with the invention.

FIG. 7 is a simplfied flow diagram illustrating a method 50 for operating the monopulse radar system 100 in accordance with the invention. At step 52, the monopulse radar system is operated in the conventional manner to form first monopulse sum and difference beams point at a first beam pointing angle. At step 54, the first monopulse beams are processed to detect a potential target track at approximate potential target angles. The foregoing steps are conventional, and are performed by a conventional monopulse radar system. At step 56, a first ratio is calculated, of the ratio of the first difference beam to the first sum beam at the potential target angle. At step 58, second and third monopulse beams are formed at respective second and third pointing angles, which are selected as described above regarding FIG. 3. These second and third monopulse beams are processed (step 60) to detect second and third beam potential target tracks corresponding to the first beam target track. Second and third ratios are calculated of the respective second and third difference and sum beams (steps 62, 64). The potential target track is then accepted or rejected in dependence on characteristics of the first, second and third ratios (step 66). As discussed above, e.g. regarding FIG. 3, these characteristics include the signs of the ratios and their magnitudes.

The application of this method is not limited to phased array antennas. A typical reflector type of monopulse antenna has a similar sidelobe tracking problem. This technique can be used to solve the sidelobe tracking problem for the reflector type of antenna system.

This invention is applicable to radar systems designed to track low observable targets such as missiles and artillery shells to discriminate false tracks in the sidelobe region.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. In a monopulse radar system comprising a monopulse antenna array developing a sum beam and a difference beam, a method for discriminating against false sidelobe tracking, comprising a sequence of the following steps:

forming first monopulse sum and difference beams pointing at a first beam pointing angle;

processing said first monopulse beams to detect a potential target track at an approximate potential target angle;

calculating a first ratio of said first difference beam and said first sum beam at said first beam target angle;

forming second and third monopulse sum and difference beams at respective second and third beam pointing angles offset from said first beam pointing angle;

processing said second and third monopulse beams to detect second and third beam potential target tracks corresponding to said first beam target track;

calculating a second ratio of said second difference beam and said second sum beam;

calculating a third ratio of said third difference beam and said third sum beam; and accepting or rejecting said potential target track as a true target track in dependence on characteristics of said first, second and third ratios.

2. The method of claim 1 wherein said second and third beam pointing angles are selected in dependence on a power value calculated from said first ratio.

3. The method of claim 1 wherein said second and third beams are selected as offset angles from said first pointing angle and toward said target pointing angle if said power value equals or exceeds a predetermined threshold.

4. The method of claim 3 wherein said step of accepting or rejecting said track comprises accepting said potential target as a true target track only if magnitudes of said first, second and third ratios decrease monotonically from said first ratio to said second ratio, and from said second ratio to said third ratio, and rejecting said potential target if said magnitudes do not decrease monotonically.

5. The method of claim 1 wherein said characteristics of said ratios include signs of said ratios, and said step of accepting or rejecting said track comprises accepting said potential target as a true target track only if said signs of said ratios are the same, and rejecting said potential target if said signs are not the same.

6. The method of claim 3 wherein said second beam offset angle is set equal to one third of an offset angle by which said estimated target angle is offset from said first pointing angle, and said third beam offset angle is set equal to three fourths of said offset angle.

7. The method of claim 1 wherein said second and third beams are selected as offset angles from said first pointing angle and away from said target pointing angle if said power value is less than a predetermined threshold.

8. The method of claim 7 wherein said step of accepting or rejecting said track comprises accepting said potential target as a true target track if magnitudes of said first, second and third ratios increase monotonically from said first ratio to said second ratio, and from said second ratio to said third ratio, and rejecting said potential target if said magnitudes do not increase monotonically.

9. The method of claim 7 wherein said characteristics of said ratios include signs of said ratios, and said step of accepting or rejecting said track comprises accepting said potential target as a true target track only if said signs of said ratios are the same, and rejecting said potential target if said signs are not the same.

10. The method of claim 7 wherein said antenna is characterized by a boresight, and said first target angle is offset from said boresight, and wherein said second and third beam pointing angles are selected as offsets from said boresight at 20 percent and at 65 percent, respectively, of a 3 dB beamwidth of said sum beam.

11. In a monopulse radar system comprising a monopulse antenna array developing a main sum beam, a main difference beam, at least one sidelobe sum beam and at least one sidelobe difference beam, and wherein said main sum beam is wider than said sidelobe sum beam, a method for discriminating against false sidelobe tracking, comprising a sequence of the following steps:
forming first monopulse sum and difference beams pointing at a first beam pointing angle;
processing said first monopulse beams to detect a potential target track at an approximate potential target angle relative to said first beam pointing angle;
calculating a first ratio of said first difference beam and said first sum beam at said first beam target angle;
forming second and third monopulse sum and difference beams at respective second and third beam pointing angles offset from said first pointing angle;
processing said second and third monopulse beams to detect second and third beam potential target tracks corresponding to said first beam target track;
calculating a second ratio of said second difference beam and said second sum beam;
calculating a third ratio of said third difference beam and said third sum beam; and
accepting or rejecting said potential target track as a true target track in dependence on characteristics of said first, second and third ratios to exploit the difference in widths of the respective main sum and sidelobe sum beams.

12. The method of claim 11 wherein said second and third beam pointing angles are selected in dependence on a power value calculated from said first ratio.

13. The method of claim 11 wherein said second and third beams are selected as respective second and third beam offset angles from said first pointing angle and toward said target pointing angle if said power value equals or exceeds a predetermined threshold.

14. The method of claim 13 wherein said second beam offset angle is set equal to one third said estimated target offset angle, and said third beam offset angle is set equal to three fourths of said estimated target offset angle.

15. The method of claim 13 wherein said step of accepting or rejecting said track comprises accepting said potential target as a true target track only if magnitudes of said first, second and third ratios decrease monotonically from said first ratio to said second ratio, and from said second ratio to said third ratio, and rejecting said potential target if said magnitudes do not decrease monotonically.

16. The method of claim 15 wherein said characteristics of said ratios include signs of said ratios, and said step of accepting or rejecting said track further comprises accepting said potential target as a true target track only if said signs of said ratios are the same, and rejecting said potential target if said signs are not the same.

17. The method of claim 11 wherein said second and third beams are selected as offset angles from said first pointing angle and away from said target pointing angle if said power value is less than a predetermined threshold.

18. The method of claim 17 wherein said step of accepting or rejecting said track comprises accepting said potential target as a true target track if magnitudes of said first, second and third ratios increase monotonically from said first ratio to said second ratio, and from said second ratio to said third ratio, and rejecting said potential target if said magnitudes do not increase monotonically.

19. The method of claim 18 wherein said characteristics of said ratios include signs of said ratios, and said step of accepting or rejecting said track comprises accepting said potential target as a true target track only if said signs of said ratios are the same, and rejecting said potential target if said signs are not the same.

20. The method of claim 17 wherein said antenna is characterized by a boresight, and said first target angle is offset from said boresight, and wherein said second and third beam pointing angles are selected as offsets from said boresight at 20 percent and at 65 percent, respectively, of a 3 dB beamwidth of said sum beam.

21. In a monopulse radar system comprising a monopulse antenna array developing a main sum beam, a main difference beam, at least one sidelobe sum beam and at least one sidelobe difference beam, and wherein said main sum beam is wider than said sidelobe sum beam, a method for discriminating against false sidelobe tracking, comprising a sequence of the following steps:
forming first monopulse sum and difference beams pointing at a first beam pointing angle;
processing said first monopulse beams to detect a potential target track at an approximate potential target angle relative to said first beam pointing angle;

calculating a first ratio of said first difference beam and said first sum beam at said first beam target angle;

forming second and third monopulse sum and difference beams at respective second and third beam pointing angles offset from said first pointing angle;

processing said second and third monopulse beams to detect second and third beam potential target tracks corresponding to said first beam target track;

calculating a second ratio of said second difference beam and said second sum beam;

calculating a third ratio of said third difference beam and said third sum beam; and processing said first, second and third ratios to accept or reject said potential target track as a true target track in dependence on characteristics of said ratios to exploit the difference in widths of the respective main sum and sidelobe sum beams, said processing comprising rejecting said potential track if said ratios are not of the same sign, and rejecting said potential track if respective magnitudes of said first, second and third ratios do not monotonically increase or decrease.

* * * * *